United States Patent
Reed

[11] Patent Number: 5,901,494
[45] Date of Patent: May 11, 1999

[54] HOOK MOUNTED SINKER AND MOUNTING METHOD

[76] Inventor: Herb Reed, 525 Kensington Rd., Southington, Conn. 06489

[21] Appl. No.: 08/892,950

[22] Filed: Jul. 15, 1997

[51] Int. Cl.$^6$ ................................... A01K 83/06
[52] U.S. Cl. ..................... 43/44.81; 43/42.38; 43/42.53
[58] Field of Search ................ 43/42.37, 42.38, 43/42.39, 44.87, 44.89, 44.92, 44.81, 44.8, 42.53

[56] References Cited

U.S. PATENT DOCUMENTS

| | | | |
|---|---|---|---|
| 2,587,311 | 2/1952 | Golnick | 43/44.87 |
| 2,910,800 | 11/1959 | Cicala | 43/42.37 |
| 2,968,113 | 1/1961 | Multanen | 43/42.37 |
| 3,999,326 | 12/1976 | Wolf | 43/44.81 |
| 4,459,775 | 7/1984 | Ratte | 43/44.89 |
| 4,530,180 | 7/1985 | Gwaldacz | 43/44.81 |
| 4,691,467 | 9/1987 | Brimmer | 43/44.8 |
| 5,038,513 | 8/1991 | Hardin | 43/42.38 |
| 5,222,321 | 6/1993 | Lu | 43/44.81 |

FOREIGN PATENT DOCUMENTS

| | | | |
|---|---|---|---|
| 1395623 | 3/1965 | France | 43/42.38 |
| 81897 | 6/1953 | Norway | 43/42.38 |

*Primary Examiner*—Kurt Rowan
*Attorney, Agent, or Firm*—McCormick, Paulding & Huber

[57] ABSTRACT

A sinker weight is secured to the shank of an associated fishhook by a bail integrally formed on the sinker weight and having an aperture receiving a portion of the hook shank therethrough. The sinker weight is further secured to the shank by an elastomeric O-ring which surrounds an associated portion of the hook shank and a reduced neck portion on the sinker weight.

11 Claims, 2 Drawing Sheets

HOOK MOUNTED SINKER AND MOUNTING METHOD

BACKGROUND OF THE INVENTION

This invention relates in, general to fishing equipment and deals more particularly with improvements in weighted fishhooks.

In the sport of fishing, whether casting, troiling or plumbing the depths, the angler often finds it desirable to employ a rig wherein weight is concentrated at the hook. Weighted fishhooks are well-known in the fishing art. One type of hook carries a weight which is permanently attached to the hook shank. Fishhooks of this general type are illustrated and described in the patents to Porter U.S. Pat. No. 1,295,370; Iffland, Jr. et al. U.S. Pat. No. 2,121,291; Woolfe U.S. Pat. No. 2,765,572; and Kepler U.S. Pat. No. 2,989,817. An example of a type of hook which carries a detachable weight is illustrated by the patents to Cook U.S. Pat. No. 3,181,265 and Grigsby, Jr. U.S. Pat. No. 5,335,443.

It is the general aim of the present invention to provide an improved detachable and reusable hook mounted sinker weight which may be readily rigged in the field and an improved method for mounting or rigging such a weight on an associated fishhook.

SUMMARY OF THE INVENTION

In accordance with the invention, a sinker weight assembly for attachment to a fishhook having an axially elongated shank includes a sinker weight having a bail attached to one portion thereof and defining an aperture for receiving an associated part of the fishhook shank therethrough. The assembly further includes at least one O-ring for encircling engagement with another portion of the sinker weight and for encircling an associated portion of the fishhook shank to releasably secure the sinker weight to the fishhook.

DETAILED DESCRIPTION OF PREFERRED EMBODIMENT AND MOUNTING METHOD

Figure 1:
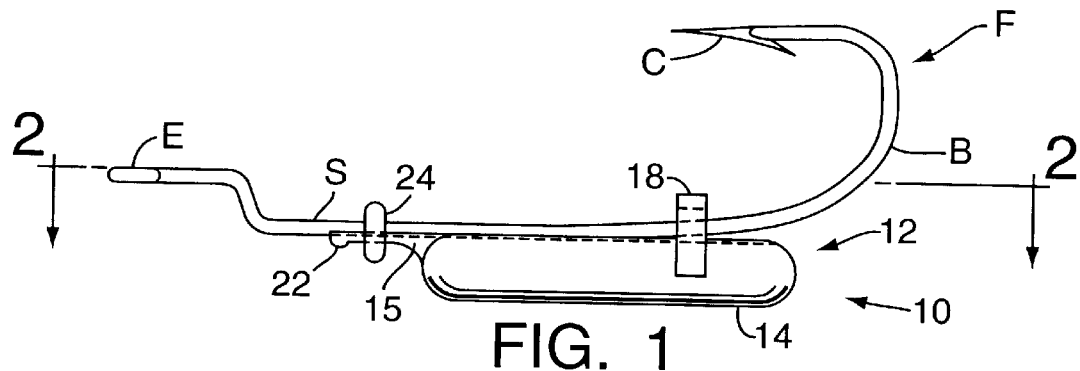
FIG. 1 is a side elevational view of a sinker weight assembly embodying the present invention and shown attached to a shank of an associated fishhook.

In the drawings and in the description which follows, the present invention is illustrated and described with reference to a sinker weight assembly embodying the present invention and indicated generally by the reference numeral 10. The illustrated assembly 10 includes a sinker weight, designated generally by the reference numeral 12, and at least one O-ring indicated at 24. Successive steps for attaching a sinker weight, such as the weight 12, to an associated fishhook are also illustrated and hereinafter described. In the description that follows, and in the claims, the sinker weight assembly of the present invention is described as it appears oriented in the drawings. Terms such as front, rear, upper and lower are employed for convenience in describing the illustrated assembly and the method for attaching it to an associated fishhook. However, the aforesaid directional terms are not intended to impose limitations on the invention, since the illustrated assembly may be deployed in various orientations other than the one illustrated.

In FIG. 1, the sinker weight 12 is shown releasably attached to a fishhook F. As shown, the fishhook F has an elongated shank portion, designated by the letter S, and a bend portion B, integrally connected to a forward end of the shank portion S. The hook terminates at a rearwardly extending barbed and pointed end portion C. The rear end part of the shank portion S is upwardly offset and carries a line connecting eyelet E. The sinker or hanger weight 12 is attached to the shank portion S and depends from the fishhook F. The manner in which the sinker weight assembly 10 is attached to the fishhook F, and a method for mounting it on an associated fishhook will be hereinafter considered in further detail.

Referring now particularly to FIGS. 2–5, the sinker or hanger weight 12 preferably comprises a unitary structure cast from an appropriate material of sufficient density, an environmentally friendly metal being presently preferred. The forward or frontal portion of the sinker weight 12 comprises a weight element 14 wherein the mass of the device is concentrated. The weight element portion of the device may take various forms. However, the illustrated weight element 14 comprises an axially elongated generally cylindrical member having hemispherically shaped forward and rear end portions which impart a generally sausage-like appearance to the weight element.

Figure 2:
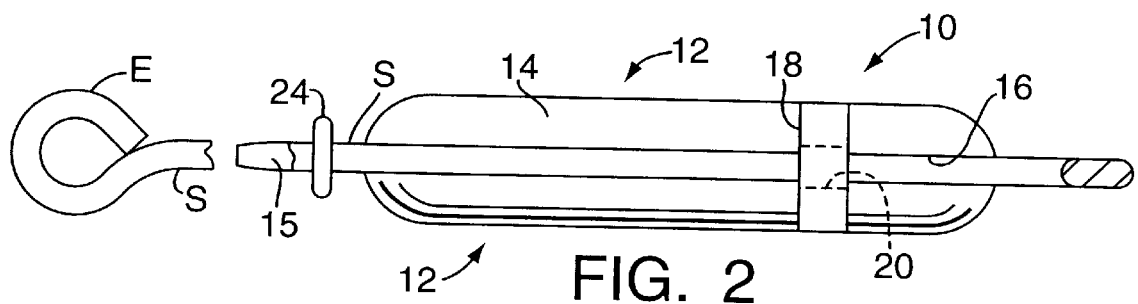
FIG. 2 is a somewhat enlarged fragmentary sectional view taken along the line 2—2 of FIG. 1.
Figure 3:
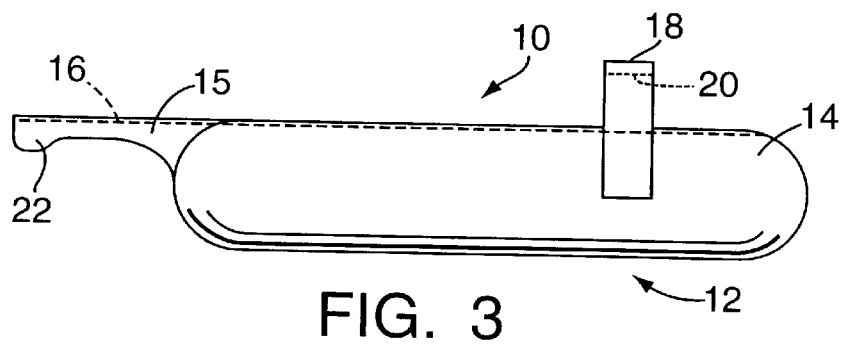
FIG. 3 is a side elevational view of the sinker weight.
Figure 5:
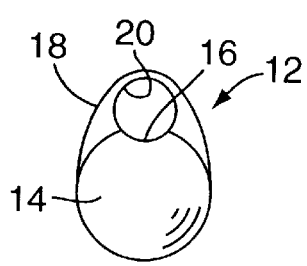
FIG. 5 is a front elevational view of the sinker weight.

A reduced neck portion indicated at 15 integrally connected to the weight element 14, and somewhat resembling the neck of a violin, projects rearwardly from the upper portion of the weight element 14 as best shown in FIGS. 2 and 3. An upwardly open shallow rectilinear groove 16 formed in the upper surface portion of the sinker weight 12 extends throughout the length of the device, that is from the front end to the rear end of the sinker weight, substantially as shown, and defines the upper surface of the neck portion 15. A strap or bail indicated at 18 and integrally connected to the weight element 14 near the forward end of the sinker weight defines a generally cylindrical forwardly open aperture 20 for receiving and associated part of the shank portion S therethrough. Preferably, and as shown, a part of the arcuate groove 16 defines a part of the aperture 20 as best shown in FIG. 5. The aperture 20 is sized to allow the pointed barbed end C to pass freely therethrough. An enlargement or depending projection 22 is formed on the neck portion 15 at the rear end thereof as best shown in FIG. 3 for a purpose will be hereinafter discussed.

As previously noted, the sinker weight assembly 10 further includes at least one elastomeric O-ring 24. The O-ring is preferably made from neoprene rubber or other suitable elastomeric material and has a central aperture sized to be received on and surround associated parts of the sinker weight neck portion 15 and the shank portion of the hook F when the O-ring is in its weight retaining position, as it appears in FIGS. 1 and 2.

Figure 6:
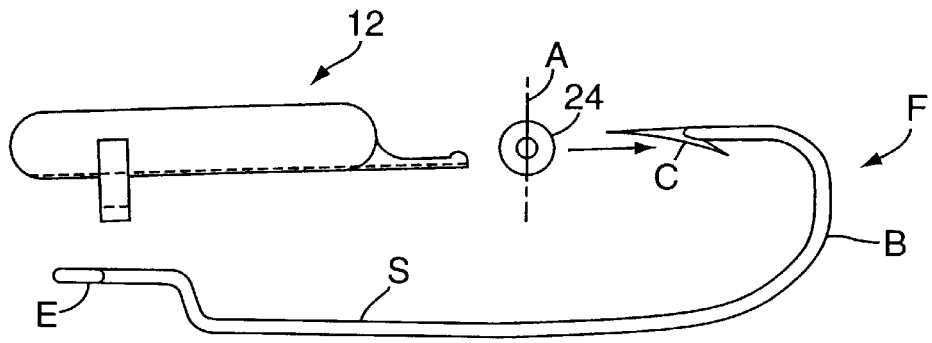
FIGS. 6–9 illustrate successive steps in a method for attaching a sinker weight assembly to the shank of an associated fishhook.

FIGS. 6–9 illustrate successive steps in a method for attaching a sinker weight, such as the weight 12, to an associated fishhook F oriented substantially as shown. The O-ring 24, which is shown in FIG. 6 rotated approximately 90° about a vertical axis A from its normal position of assembly, is first slipped over the pointed barbed end C and moved downwardly along the bend portion B of the fishhook to a position near the rear end portion of the shank portion S, the latter position of the O-ring being shown in FIG. 7. Since the O-ring used in practicing the invention is sized to receive associated portions of both the hook shank and the neck portion 14 of an associated sinker weight, the O-ring can ordinarily slipped over the fishhook pointed and barbed end C without risk of being damaged.

Figure 4:
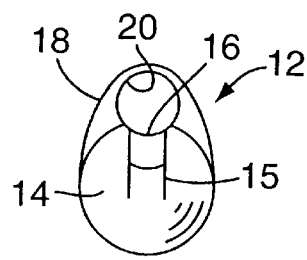
FIG. 4 is a rear elevational view of the sinker weight.
Figure 7:
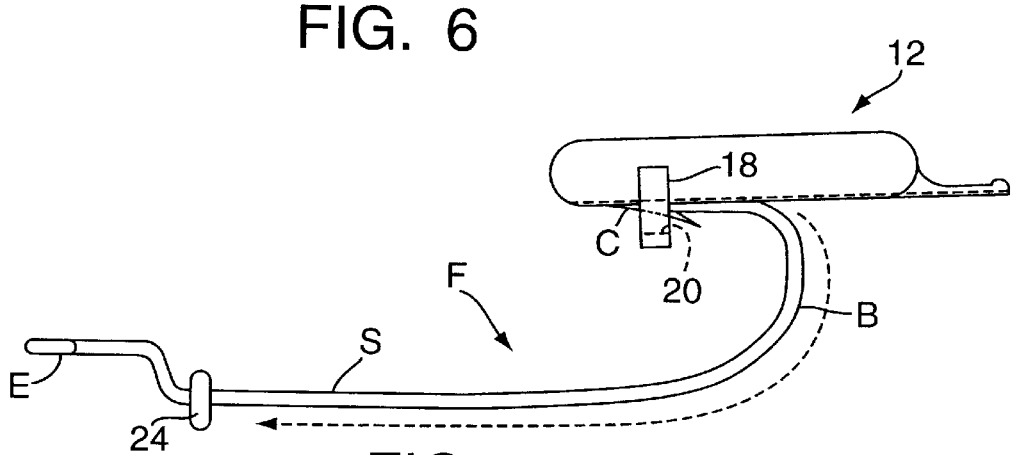
Figure 8:
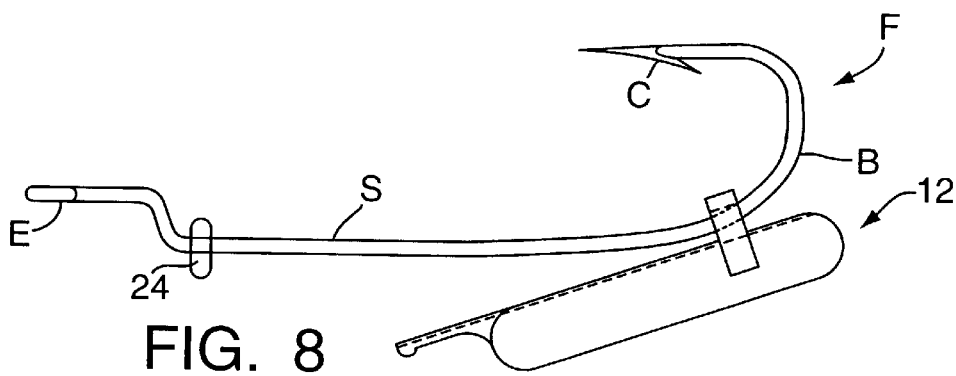
Figure 9:
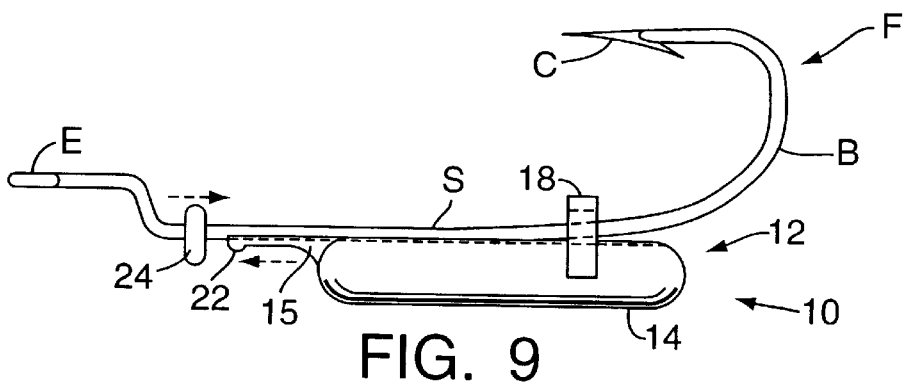

After the O-ring has been positioned near the rear of the hook shank portion S, the sinker weight 12 is held in an inverted position with its neck portion 15 extending in a forward direction, as shown in FIG. 4. In the latter position, the bail 18 will be disposed below the weight element 12 so that the pointed and barbed end C may be slipped through the aperture 20, as shown in FIG. 7. When the bail has cleared the barbed end portion of the fishhook F the sinker weight 10 is moved downwardly and along the bend B in the direction indicated by the directional arrows in FIG. 7 which causes reversal of the direction of extent of the neck portion 15, as shown in FIG. 8. When the sinker weight 12 attains the approximate position relative to the fishhook F shown in FIG. 9, the O-ring 24 is moved forwardly along the shank portion of the hook and forced over the O-ring retaining projection 22 to the approximate position shown in FIG. 1 wherein the O-ring 24 substantially coaxially surrounds associated parts of the shank portion S and the neck portion 15 forward of the retaining projection 22. The O-ring 24 is preferably sized to lightly engage and frictionally grip the neck portion 15 and preferably also a part of the shank portion S to hold the sinker weight in position on the fishhook F, substantially as shown in FIG. 1.

It will be noted that the aperture 20 formed in the rigid bail 18 is somewhat larger than the cross-sectional area of the portion of the shank which extends through it. Thus, the forward portion of the device, where weight is concentrated, is somewhat more loosely retained on the fishhook than the rear or neck portion which is retained by the O-ring 24. If the angler finds this condition to be objectionable as in casting, for example, the condition may be easily overcome by the use of one or more additional O-rings to secure the neck portion of the device and such arrangement for securing the device on an associated fishhook is contemplated with in the scope of the present invention. It should now be apparent that the sinker weight may be detached from the fishhook for use with another hook.

I claim:

1. A sinker weight assembly for attachment to a fishhook having an axially elongated shank, said assembly comprising a sinker weight having a shallow outwardly open groove therein extending along substantially the entire length thereof for receiving at least a portion of a fishhook shank therein when the sinker weight is secured to the fishhook, said sinker weight including a bail connected to one portion thereof and partially defining an aperture for receiving an associated portion of the fishhook shank therethrough, said aperture being further defined by an associated portion of said groove, and means for releasably securing another portion of said sinker weight to the fishhook shank including at least one elastomeric O-ring for encircling engagement with said another portion and for encircling an associated part of the fishhook shank, whereby the sinker weight may be releasably secured to the fishhook.

2. A sinker weight assembly as set forth in claim 1 wherein said one portion comprises a weight element and said another portion is further characterized as a reduced neck portion projecting from said weight element.

3. A sinker weight assembly as set forth in claim 2 wherein said neck portion has an enlargement at a free end thereof.

4. A sinker weight assembly as set forth in claim 1 wherein said shallow groove has a generally arcuate cross-section.

5. A sinker weight assembly as set forth in claim 1 wherein said bail is further characterized as a rigid bail integrally connected to said sinker weight.

6. A sinker weight assembly as set forth in claim 2 wherein said weight element is axially elongated and generally cylindrical and has generally hemispherically shaped opposite end portions.

7. The combination comprising a fishhook having an axially elongated shank portion, a sinker weight having a weight element and a reduced neck portion projecting from said weight element and having a free end portion, said sinker weight having a shallow groove therein extending substantially along the entire length thereof, a bail connected to said weight element and defining a portion of an aperture, said groove further defining said aperture and a part of said neck portion, said aperture receiving said shank portion therethrough, said shank portion being at least partially disposed within said groove, and a resilient elastomeric O-ring surrounding an associated part of said shank portion and disposed in surrounding engagement with said reduced neck portion in axially spaced relation to said bail, whereby said sinker weight is releasably attached to said fishhook.

8. The combination as set forth in claim 7 wherein said neck portion has an enlargement at a free end thereof and said O-ring is disposed in engagement with said neck portion between said enlargement and said weight element.

9. A method for attaching a sinker weight to a fishhook having a bend portion terminating at a barbed end and an axially elongated shank integrally connected to said bend portion, said method comprising the steps of providing a sinker weight assembly including a resilient elastomeric O-ring and a sinker weight having a bail defining an aperture sized to receive the barbed end of the fishhook therethrough, and an outwardly open groove partially defining the aperture, passing the barbed end portion of the fishhook through the O-ring moving the O-ring relative to the fishhook along the bend portion of the fishhook to and along the shank portion of the fishhook, passing the barbed end portion of the fishhook through the aperture in the bail, moving the sinker weight relative to the fishhook and along the bend portion to position the bail on the shank portion of the fishhook and to position the shank portion of the fishhook in the groove, and moving said O-ring along the shank portion and relative to the sinker weight to position the O-ring in surrounding relation to an associated portion of the sinker weight axially spaced from the bail, whereby the sinker weight is attached to the fishhook.

10. The method as set forth in claim 9 wherein the step of providing the sinker weight is further characterized as providing a sinker weight having a weight element and a reduced neck portion projecting from the weight element and the step of moving the O-ring is further characterized as moving the O-ring to a position wherein the O-ring surrounds an associated part of the neck portion.

11. The method as set forth in claim 10 wherein the step of providing a sinker weight is further characterized as providing an enlargement on a free end part of the neck portion and the step of moving the O-ring is further characterized as moving the O-ring over the enlarged portion and onto the neck portion.

\* \* \* \* \*